US012688177B2

(12) United States Patent
Nakryyko et al.

(10) Patent No.: US 12,688,177 B2
(45) Date of Patent: Jul. 21, 2026

(54) CONFIGURING A DISTRIBUTED DATABASE

(71) Applicant: SAP SE, Walldorf (DE)

(72) Inventors: Lyubov Nakryyko, Heidelberg (DE); Susanne Janssen, Waldbronn (DE)

(73) Assignee: SAP SE, Walldorf (DE)

( * ) Notice: Subject to any disclaimer, the term of this patent is extended or adjusted under 35 U.S.C. 154(b) by 165 days.

(21) Appl. No.: 18/449,128

(22) Filed: Aug. 14, 2023

(65) Prior Publication Data

US 2024/0078224 A1 Mar. 7, 2024

(30) Foreign Application Priority Data

Sep. 6, 2022 (EP) ..................................... 22194120

(51) Int. Cl.
| | |
|---|---|
| *G06F 16/00* | (2019.01) |
| *G06F 16/22* | (2019.01) |
| *G06F 16/27* | (2019.01) |

(52) U.S. Cl.
CPC ........ *G06F 16/2282* (2019.01); *G06F 16/278* (2019.01)

(58) Field of Classification Search
CPC ............................ G06F 16/2282; G06F 16/278
USPC ......................................................... 707/803
See application file for complete search history.

(56) References Cited

U.S. PATENT DOCUMENTS

| | | | | |
|---|---|---|---|---|
| 9,031,994 B1 * | 5/2015 | Cao | ....................... | G06F 16/278 |
| | | | | 707/798 |
| 2017/0075981 A1 * | 3/2017 | Carlsson | ............... | G06F 16/285 |
| | | | | 707/707 |

| | | | | |
|---|---|---|---|---|
| 2018/0173763 A1 | 6/2018 | Xia et al. | | |
| 2018/0253457 A1 * | 9/2018 | Heinle | ................ | G06F 16/2282 |
| 2018/0288438 A1 * | 10/2018 | Chao | ...................... | H04N 19/12 |
| | | | | 707/707 |
| 2018/0315229 A1 * | 11/2018 | Kim | ........................ | G06T 11/26 |
| | | | | 707/707 |
| 2021/0073287 A1 * | 3/2021 | Hunter | .................. | H04L 63/123 |
| | | | | 707/707 |
| 2021/0073291 A1 * | 3/2021 | Hunter | ................... | G06N 3/045 |
| | | | | 707/707 |

(Continued)

FOREIGN PATENT DOCUMENTS

| | | |
|---|---|---|
| CN | 111782654 A | 10/2020 |

OTHER PUBLICATIONS

"Communication—European Extended Search Report", European Patent Office, 16.02.2023 (Feb. 16, 2023), for European Application No. 22194120.6-1203, 17pgs.

(Continued)

*Primary Examiner* — Alexandria Y Bromell

(74) *Attorney, Agent, or Firm* — Buckley, Maschoff & Talwalkar LLC

(57) ABSTRACT

A system of configuring a database which is distributed across multiple nodes according to a table distribution, e.g., by storing respective tables of the database at respective nodes. A graph partitioning procedure is applied to a graph of the distributed database, with vertices representing tables and edges representing cross-table operations. A distribution of the tables across the nodes is determined based on the partitioning. The storage of the tables is configured according to the determined distribution.

19 Claims, 4 Drawing Sheets

(56) References Cited

U.S. PATENT DOCUMENTS

2024/0078224 A1* 3/2024 Nakryyko .......... G06F 16/2282
707/707

OTHER PUBLICATIONS

Hao, Zhang et al., "English-language Translation of Chinese Office Action, for Chinese Application No. CN111782654A, entitled a method for data partition storage in distributed database", Oct. 16, 2020 (Oct. 16, 2020), for 9pgs.

* cited by examiner

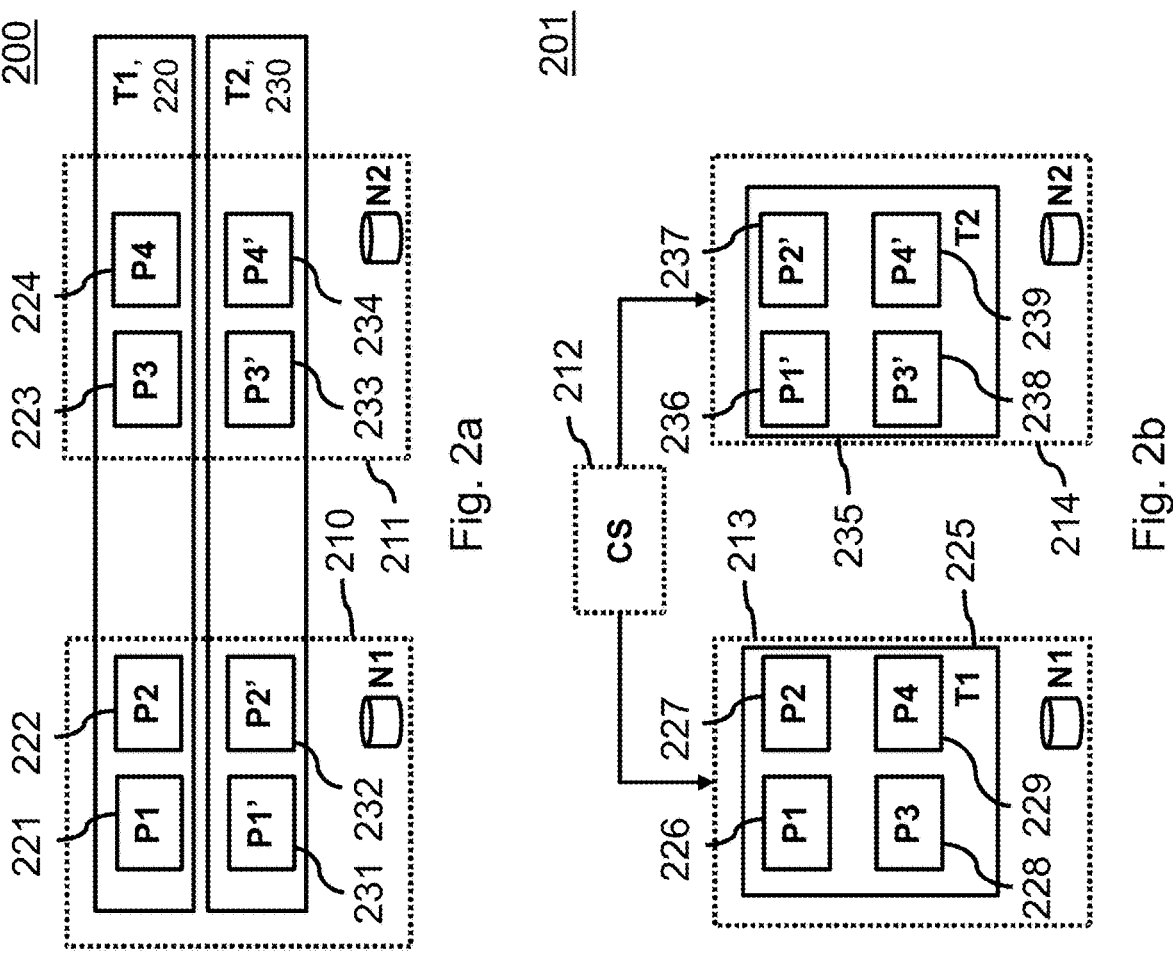
Fig. 2a
Fig. 2b
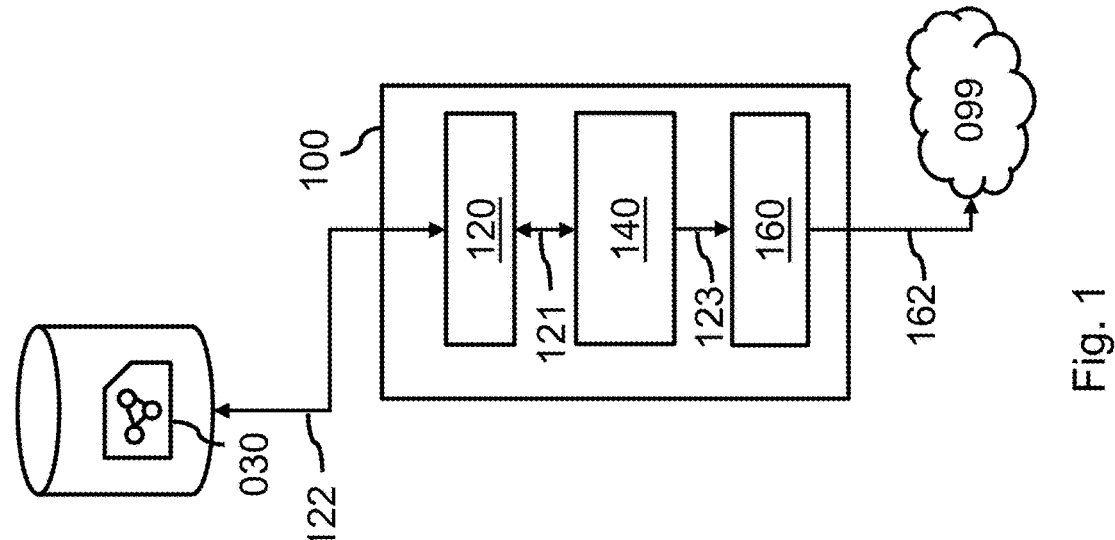
Fig. 1

CONFIGURING A DISTRIBUTED DATABASE

CROSS-REFERENCE TO RELATED APPLICATION

This application claims the benefit of and priority to EP Patent Application No.: 22194120.6, filed Sep. 6, 2022, the entire contents of which are incorporated herein by reference for all purposes.

FIELD

The invention relates to a computer-implemented method of configuring a distributed database; to a corresponding configuration system; and to a distributed database system. The invention further relates to a computer-readable medium.

BACKGROUND

With growing digitization, database systems are having to deal with more and more volume and complexity of data. In many cases, the data is too large to be stored by a single system, e.g., a single server device, so it needs to be distributed among multiple nodes of the database system. For this, there are two main approaches. A first approach is partition distribution, where tables are partitioned among the multiple nodes, such that respective node store respective portions of the same table. A second approach is table distribution, where respective tables of the database are stored at respective nodes.

Table distribution is particularly suitable when the distributed database stores many tables, for example, at least 1000 or even at least 1000000 tables. An example of a distributed database that can use table distribution, is SAP S/4HANA. In SAP S/4HANA, the distribution of tables across the multiple nodes, also referred to as the scale-out table group assignment, is mostly determined manually.

An advantage of table distribution is that database queries that involve only a single table, can be handled efficiently by the corresponding node. However, in the table distribution setting, a query that involves multiple tables stored at different nodes, is much less efficient to execute. It is thus desirable to avoid such cross-node queries.

SUMMARY

It would be desirable to configure a distributed database that uses table distribution such that its computational efficiency is improved; and in particular, such that cross-node queries can be reduced to a non-criticality.

In accordance with a first aspect of the invention, a computer-implemented method and a corresponding configuration system are provided for configuring a distributed database, as defined by claims 1 and 13, respectively. In accordance with another aspect of the invention, a distributed data system is provided that comprises the configuration system, as defined by claim 14. In accordance with an aspect of the invention, a computer-readable medium is provided, as defined by claim 15.

Various aspects relate to the configuration of a database that is distributed across multiple nodes according to a table distribution, meaning that respective tables of the database are stored at respective nodes, e.g., at respective different computing devices. This is in contrast to partition distribution, where some or all of the tables are partitioned into different portions that are stored at the respective nodes. It is noted that table distribution can be used in combination with replication, wherein copies of a table are stored at one or more nodes in addition to the node that stores the table itself. The original table is stored in full at a particular node, however.

The inventors envisaged to provide techniques for configuring the distributed database such that its workload scales better and performance is improved. Namely, the inventors found techniques to determine an improved distribution of the tables of the distributed database across the multiple nodes. Having determined this improved distribution, the storage of the tables can then be configured according to the determined distribution. For example, the distribution can be used to initially configure the database at deployment, e.g., before it has been populated with any instance-specific data; or to reconfigure the database after it has already been deployed.

In particular, the distribution of the tables (which is also referred to herein as scale-out table group assignment, or table group assignment), may be determined based on a graph representation of the distributed database. Respective vertices of the graph may represent the respective tables. Respective edges of the graph may represent cross-table operations involving adjacent vertices of the respective edges. In particular, an edge between a first vertex representing a first table, and a second vertex representing a second table, may represent one or more cross-table operations involving the tables, that are determined to have taken place and/or expected to take place in the future. The cross-table operations may include one or more operations executed as SQL statements, for example. For example, the cross-table operations may comprise one or more database joins (e.g., corresponding to a SQL JOIN statement). Examples of graphs representing distributed databases are described herein.

In order to determine a distribution of tables across nodes, the inventors envisaged to apply a graph partitioning procedure to this graph. Such a procedure is also referred to as a graph decomposition procedure. The graph partitioning procedure may result in a partitioning of the graph into multiple subgraphs, that is, respective nodes may be assigned to respective subgraphs. The graph partitioning procedure may be configured to (at least heuristically) maximize the number and/or weight of edges between vertices that belong to the same subgraph, and/or minimize the number and/or weight of edges between vertices that belong to different subgraphs.

With edges corresponding to cross-table operations, the graph partitioning procedure may effectively result in subgraphs of tables such that cross-table operations within a subgraph are more common than cross-table operations between subgraphs. This provides useful information for determining a distribution of tables across nodes, because the partitioning indicates that it is beneficial to store all vertices of a subgraph on the same node. Namely, in such a case, cross-table operations between these vertices are not cross-node, and hence can be performed more efficiently, e.g., without the need to exchange table contents across nodes for the query and/or without the need for automated replication of the table. Accordingly, by using the table graph decomposition to determine the distribution of tables across nodes, a distribution can be determined that results in a more efficient configuration of the distributed database, because the number of expected cross-table operations that are also cross-node operations (meaning that the operation involves tables from multiple different nodes) can be limited.

Moreover, using a graph partitioning procedure may allow to determine the distribution of tables efficiently, particularly for large databases involving many tables. In general, determining an assignment of tables to nodes in such a way that the number of expected cross-table operations is minimized, may be phrased as an optimization problem over all possible assignments of tables to nodes, with certain constraints (e.g. representing limits on storage sizes and/or computational loads at the respective nodes). Phrased in this general way, however, this problem would be hard to solve, especially if the number of tables of the distributed database system is large. By using a graph partitioning procedure, interestingly, such a general optimization can be avoided, and the table distribution can be determined in two steps that can be efficiently implemented: the graph partitioning and the derivation of the distribution from the partitioning. Thereby, effectively, a heuristic way of determining a good distribution of tables may be provided that allows efficient configuration, especially of large distributed databases.

The use of the proposed techniques also obviates the need to manually specify a table distribution. Such a manual process in practice is error-prone and biased, and generally does not lead to optimal decisions. This is also because it is not feasible for a human to take into account all known cross-table operations, especially for large distributed databases. Instead, such a manual specification would more typically be based on domain knowledge of which tables relate to each other content-wise, and possibly based on a simulation, given a manually defined distribution, of the performance of the database. Instead, the provides techniques give a transparent way of determining a distribution of tables, that rules out bias. Manual customization of the determined distribution is however still possible, as also described herein.

In particular, the provided techniques allow to efficiently customize a database product having a predefined schema, for a particular environment. Namely, for a given predefined database schema, e.g. for a given graph representation of the distributed database, the table distribution that is determined as described herein, typically depends on where the database product is deployed. For example, the number of nodes and/or the division of storage or computation capacity among the nodes can differ between different deployments. By using the provided techniques, the database product can be automatically customized per deployment. In such cases, it is possible to perform the graph partitioning independently of the particular distributed database, e.g., to share the partitioning between deployments but to use the differences when determining the table distribution. It is also possible to take the specifics of a particular deployment already into account when applying the graph partitioning, e.g., by setting a desired number of subgraphs or other parameters of the graph partitioning based on the number of available nodes, etc.

Optionally, the distribution is determined by assigning the respective subgraphs of the partitioning to respective nodes. As a consequence, all tables of a subgraph may be stored at the same node of the distributed database system. This is a good choice to minimize the computational and communication complexity of cross-table operations. However, it is possible to deviate from this if needed; for example, a subgraph that has a too high computational load to be handled by one node may be divided into two subgraphs, e.g., based on the connection density between the vertices that are assigned to respective nodes. In such a case, the nodes can replicate the tables missing from their subgraphs to each other, for example.

Generally, the partitioning of the graph and/or the distribution of subgraphs among nodes may be determined based on storage and/or computational requirements. Namely, the distribution may be defined in such a way that nodes have sufficient storage and/or computational capacity to serve the tables assigned to them, while minimizing the computational requirements associated to cross-table operations. Accordingly, the distribution may take into account both the capacities of the respective nodes and the resulting overall efficiency of the distributed database.

In particular, the distribution of tables across nodes may be determined based on respective storage sizes and/or computational loads of the tables of the respective subgraphs. In particular, subgraphs may be assigned to nodes to distribute the storage and/or computational load (at least approximately) evenly across resources available at the nodes. Storage may refer to temporary (e.g., RAM) and/or persistent (e.g., hard drive) storage, as desired.

The storage size and/or computational load of a subgraph may be computed as an aggregate (e.g., sum) of storage sizes and computational loads of the tables of the subgraph. The computational load for a table may include the computational load both of operations that involve just the table itself and of operations that also involve further tables, such as a join. The storage size and/or computational load may be based on measurements of the database system, optionally adjusted (e.g. manually) to represent an expected change in the measurement. Interestingly, in contrast to an overall CPU load that is more typically available as a metric in existing database systems, such a per-table computational load may represent computational effort spent specific to the table, and can thus be used to estimate an overall computational load implied by storing the subgraph at the node.

Optionally, the graph partitioning procedure is configured to perform a heuristic optimization of a modularity of the partitioning. In particular, the graph may be partitioned according to a community detection method, e.g., Louvain graph decomposition method or similar. Such techniques allow to partition relatively large graphs, and thus provide a solution to determine a good distribution of tables across nodes where techniques that are not based on partitioning can be very inefficient.

Optionally, the distributed database may comprise at least 1000 tables, at least 10000 tables, or at least 100000 tables. For such large amounts of tables, graph partitioning can be feasibly performed, while determining a manual distribution of tables, or basing such a distribution on other techniques than partitioning, can become infeasible.

Optionally, a hierarchical graph partitioning procedure may be used. Such a procedure may return partitionings of the graph at multiple levels, e.g. a subgraph determined at one level may be subdivided into one or more subgraphs at a lower level. These multiple partitionings may be used to determine the distribution of the tables. For example, the distribution may be determined by attempting to determine distributions of the tables according to multiple partitionings. For example, the highest level at which a distribution is found that respects the available storage and or computation capacities of the nodes, may be used. Generally, by using a hierarchical procedure, it may be ensured that a distribution can be successfully determined (which is easier for lower levels since the subgraphs are smaller), while still providing a high-quality distribution (which is easier for higher levels since more cross-table operations are included in a subgraph). Still, it is not needed to repeat the graph partitioning multiple times.

Optionally, the graph may be weighted. A weight of an edge may indicate a computational cost of cross-table operations involving adjacent vertices of the edge. The weights may be used to determine the partitioning. For example, the computational cost of an edge may be based on measurements of the database system, e.g., based on a log of previously performed operations, but can also be set or adjusted, e.g., manually, for example to represent an expected change in cost. The weight can be further based on a predefined grouping of the tables of the database. For example, the predefined grouping may be manually defined, representing domain knowledge on which tables are related and are thus preferably stored at the same node. Accordingly, table connections (e.g., JOINs or views) which jointly produce the most critical DB load may be assigned a high weight and may accordingly be less likely to be separated across the nodes. The computational cost may count the cost of performing the operation per se, e.g., not considering the cost of any needed replication.

Optionally, an operation may be determined to be a cross-table operation based on determining that the operation calls a database view or stored procedure, and determining that this database view or stored procedure in turn, directly or indirectly, calls a set of tables. In other words, when analysing an operation e.g. to construct the graph, the associated database views and/or stored procedures may be dissolved. For example, an edge between tables from this set of tables may be included, or its weight computed, based on this analysis of the called view or stored procedure. In this way, operations that do not appear directly to be cross-table operations, can be taken into account, thus leading to a more accurate representation of cross-table operations and eventually a more suitable distribution of tables across nodes.

Optionally, an indication may be obtained that a table is expensive to replicate. For example, the indication may be based on table metadata, based on statistics of how often the table modified (e.g. the number of modifications in a certain time period may exceed a certain threshold), based on a manual annotation, etc. In any case, the configuration of the distributed database can be improved by merging the subgraph that contains the indicated table, with one or more further subgraphs involved in cross-table operations with the indicated table. This ensures that more cross-table operations are in the same subgraph and thus assigned to the same node as the table, leading to a better configuration of the database. This merging can be done for example at the beginning of the determining of the table distribution. It is also possible in principle to assign a higher weight to the edges of the graph vertex corresponding to the indicated table, but by merging, it can be guaranteed that tables become part of the same subgraph, whereas partitioning may merely encourage it. Since replication is important to avoid, merging is thus preferred.

Optionally, a user request may be obtained to move a first subgraph from a first node to a second node to co-locate the first subgraph with a second subgraph on the second node. For example, in a user interface, the user may indicate the first subgraph and second subgraph, e.g., by dragging a representation of the first subgraph onto a representation of the second subgraph, or the like. In response to the user subgraph, one or more subgraphs may be determined to be moved from the second node to the first node to accommodate the moving of the first subgraph, for example, to compensate for the storage size and/or computational load of the first subgraph on the second node. These subgraphs that are determined, may in this example not include the second subgraph. By providing this moving, customization of the configuration of the database is enabled, while still using an advantageous distribution of tables as described herein.

Optionally, the distributed database may be a database that is in use, and the configuration of the distributed database may be a reconfiguring of that database. Accordingly, the distributed database may be reconfigured by moving deployed tables across the nodes according to the determined distribution. As is known per se, the database may be temporarily brought down to perform the reconfiguring as an offline reconfiguring, or the reconfiguring can be an online reconfiguring. The determining of an updated distribution (including gathering any associated data e.g. concerning storage sizes, computational loads, and/or cross-table computational costs) and the subsequent reconfiguring may be fully automated, e.g., may be performed periodically (e.g. with a period of at most or at least a week or at most or at least a month) and/or as initiated by a user.

Optionally, for a database that has been configured (e.g., reconfigured) according to the determined distribution, a request for a cross-node operation on the database may be obtained. Indeed, although the number of such cross-node operations may be reduced, they in many cases cannot be eliminated fully. In such cases, as is known per se, an automated replication may be performed to accommodate the request. In such a case, a further node may obtain a slave copy of a table of the cross-node operation from the node that stores the table. This way, the further node can perform the operation using the slave copy. Still, the database is considered to use table distribution in the sense that there is only one node that stores the (full) master copy of the table.

It will be appreciated by those skilled in the art that two or more of the above-mentioned embodiments, implementations, and/or optional aspects of the invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the invention will be apparent from and elucidated further with reference to the embodiments described by way of example in the following description and with reference to the accompanying drawings, in which:

FIG. 1 shows a configuration system for configuring a distributed database;

FIGS. 2a, 2b show distributed database systems;

It should be noted that the figures are purely diagrammatic and not drawn to scale. In the figures, elements which correspond to elements already described may have the same reference numerals.

DETAILED DESCRIPTION OF EMBODIMENTS

Figure 3:
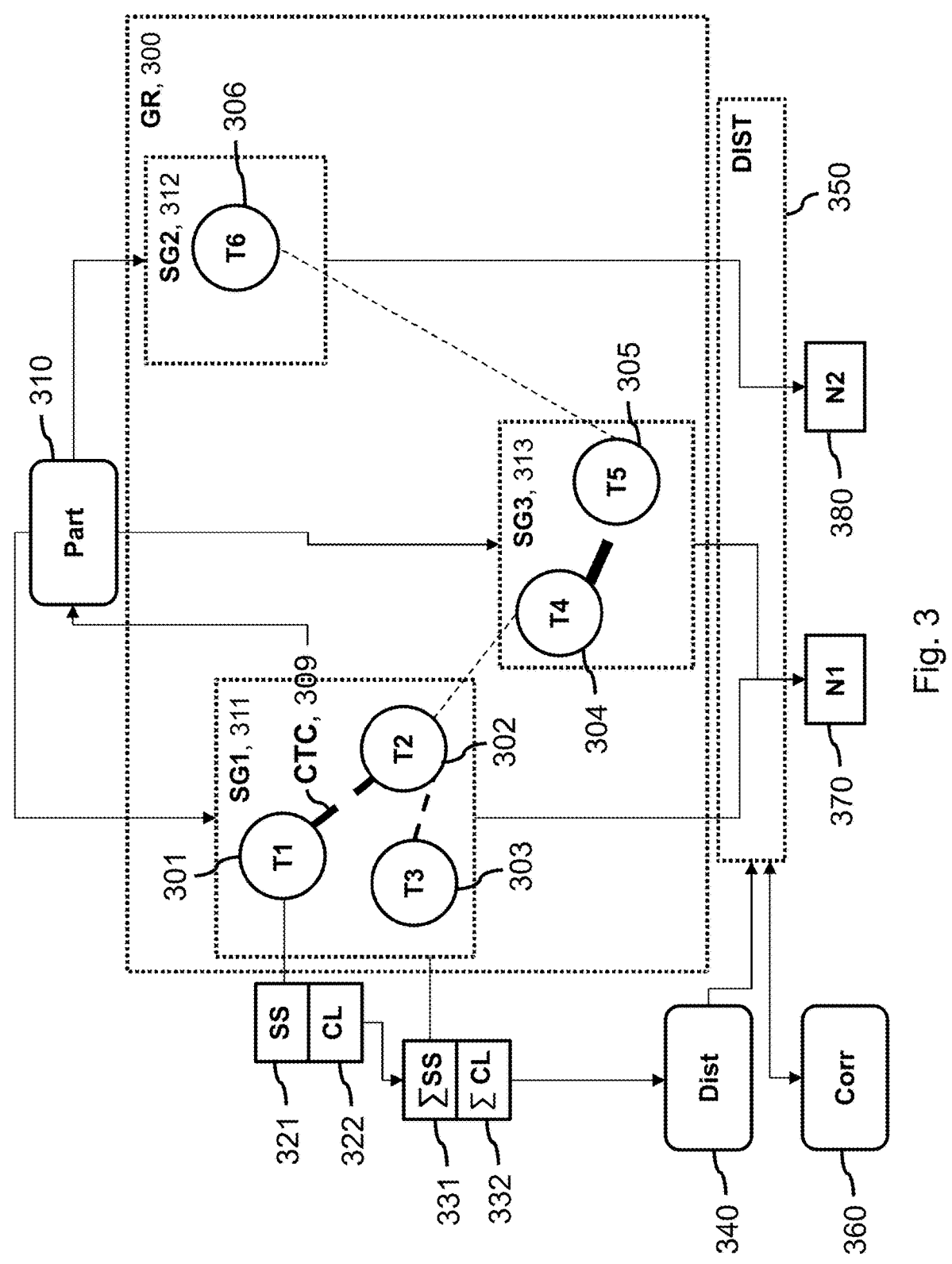
FIG. 3 shows a detailed example of how to configure a distributed database.

FIG. 1 shows a configuration system 100. System 100 may be for configuring a distributed database. The database may be distributed across multiple nodes according to a table distribution by storing respective tables of the database at respective nodes. For example, the distributed database may be operated by the database system of FIG. 2.

System 100 may comprise a data interface 120 for accessing data 030 representing a graph of the distributed database. Respective vertices of the graph may represent the respective tables. Respective edges of the graph may represent cross-table operations involving adjacent vertices of the respective edges.

For example, as also illustrated in FIG. 1, the data interface may be constituted by a data storage interface 120 which may access the data 030 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage.

The system 100 may further comprise a processor subsystem 140 which may be configured to, during operation of the system 100, apply a graph partitioning procedure to the graph to obtain a partitioning of the graph into multiple subgraphs. The processor subsystem 140 may be further configured to determine a distribution of the tables of the distributed database across the multiple nodes based on the partitioning of the graph. The processor subsystem 140 may be further configured to configure the storage of the tables according to the determined distribution of the tables across the multiple nodes.

The system 100 may further comprise an output interface for outputting the determined distribution of the tables to thereby configure the storage of the tables in the distributed database. For example, as illustrated in the figure, the output interface may be constituted by a communication interface 160 configured for communication 162 with one or more other systems of the distributed database system, in particular, the nodes across which the database is distributed, to direct the systems to configure the storage of the tables. In particular, in the case of a reconfiguring, the system 100 may direct the other systems to move tables across nodes according to a determined distribution. Database configuration systems 100 for configuring a distributed database, e.g., in combination with orchestrating incoming queries, are known per se and are also referred to as transaction processors or distributed transaction managers. In particular, system 100 may be a scale-out table placement optimization system.

Communication interface 160 may internally communicate with processor subsystem 140 via data communication 123. Communication interface 160 may be arranged for direct communication with the other systems, e.g., using USB, IEEE 1394, or similar interfaces. As illustrated in the figure, communication interface 160 may also communicate over a computer network 099, for example, a wireless personal area network, an internet, an intranet, a LAN, a WLAN, etc. For instance, communication interface 160 may comprise a connector, e.g., a wireless connector, an Ethernet connector, a Wi-Fi, 4G or 4G antenna, a ZigBee chip, etc., as appropriate for the computer network. Communication interface 160 may be an internal communication interface, e.g., a bus, an API, a storage interface, etc.

As another example, the output interface can be constituted by the data interface 120, with said interface being in these embodiments an input/output (ICY) interface, via which the determined distribution of the tables may be stored in the data storage 021. In some embodiments, the output interface may be separate from the data storage interface 120, but may in general be of a type as described above for the data storage interface 120.

In general, each system described in this specification, including but not limited to the system 100 of FIG. 1 and the various subsystems of FIG. 2b, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers.

FIG. 2a shows a detailed, yet non-limiting, example of a distributed database system. This example shows a database system that is distributed among multiple nodes N1, 210, N2, 211, according to a partition distribution as is known per se. In this case, one or more tables are stored in a partitioned way among the multiple nodes. By way of illustration, the figure shows two tables T1, 220 and T2, 230, being partitioned across the nodes N1, N2. Namely, table T1 is partitioned into partitions P1, 221 and P2, 222 at node N1 and partitions P3, 223 and P4, 224 at node N2. Similarly, table T2 is partitioned into partitions P1', 231 and P2', 232 at node N1 and partitions P3', 233 and P4', 224 at node N2. In both cases, neither node N1 nor node N2 stores the full table. When a query is performed that involves a table T1, T2, generally, such a query is performed in a distributed way, e.g., with partition pruning being used to avoid cross-node queries.

FIG. 2b shows a detailed, yet non-limiting, example of a distributed database system 201. The database system 201 is distributed among multiple nodes according to a table distribution. For example, the system can be an SAP S/4HANA system. By way of illustration, two nodes N1, 213; N2, 214 are shown, but the number of nodes can also be larger than two, e.g. there can be at least four, at least eight, or at least sixteen nodes. The respective nodes can be different devices, e.g., different cloud instances or the like, e.g., devices with a hardware configuration as described with respect to FIG. 1. The distributed database system can have additional nodes that do not store data themselves, e.g., a node operating the distributed transaction manager of the database, etc.

When using table distribution, respective tables of the database may be stored at respective nodes. Tables may or not be partitioned; but if they are partitioned, all partitions are stored on the same node. For example, a table T1, 225 is shown that is partitioned into four partitions P1, 226; P2, 227; P3, 228; P4, 229 that are all stored on node N1. Similarly, a table T2, 235 is shown that is partitioned into four partitions P1', 236; P2', 237; P3', 238; P4', 239 that are all stored on node N2. The actual number of tables in a distributed database system 201 is typically much larger, e.g., at least 1000, at least 10000, or at least 1000000. Also the overall amount of data stored in the database can be large, e.g., at least 1 GB, at least 100 GB, or at least 1 TB.

When using table distribution, a query on single table can be performed locally by the node that stores it. However, also cross-node queries can occur because of operations that involve multiple tables, such as table joins. In such cases, replication may be used to perform the query where a node different from the node that stores the table, obtains a slave copy of the table. For example, node N2 may perform an operation involving tables T1 and T2 based on it storing table T2 and obtaining a slave copy of table Ti. Various techniques for replication are known per se; in particular, replication can be performed by periodically copying the full contents of the table, also referred to as duplication.

Also shown is a configuration system CS, 212, e.g., configuration system 100 of FIG. 1. System CS may be configured to configure the storage of the tables Ti across the nodes Ni according to a distribution of the tables across the multiple nodes, determined as described herein. For example, system CS may be the distributed transaction manager of the database system 201. System CS may be combined with a node Ni into a single system, e.g., a single server device.

Various hardware configurations for the nodes Ni are possible. The nodes may have a hardware configuration as discussed with respect to FIG. 1. The nodes Ni may be configured according to a hyperscale architecture. For example, respective nodes Ni may be operated at respective virtual machines, e.g., in a cloud environment. The storage and/or computational capacities of respective nodes may differ from each other, e.g. node N1 may have more memory and/or a faster CPU than node N2, etc.

FIG. 3 shows a detailed, yet non-limiting, example of how to configure a distributed database, e.g., the distributed database system of FIG. 2b. The database system may be distributed across multiple nodes according to a table distribution, meaning that respective tables of the database are stored at respective nodes. By way of illustration, two nodes N1, 370 and N2, 380 are shown. This figure illustrates an example of how to determine a distribution of tables across nodes. The storage of the tables may be configured according to this determined distribution as discussed e.g. with respect to FIG. 2b.

The figure shows a graph GR, 300, representing the distributed database. The graph GR may be determined automatically based on data representing the database, e.g., an already deployed database or a database to be deployed. The graph can be processed in various ways, e.g., as an adjacency matrix, as an adjacency list, etc.

In graph GR, respective vertices may represent the respective tables of the distributed database. The figure illustrates six vertices T1, 301; T2, 302; T3, 303; T4, 304; T5, 305; and T6, 306, representing respective tables. This is for illustration purposes; in practice, the number of tables is typically larger, e.g., at least 1000, at least 10000, or at least 1000000. It is noted that vertices are also frequently referred to as nodes in the literature, and may also be referred to as such in this specification.

Edges of graph GR may represent cross-table operations involving adjacent vertices of the respective edges. The figure shows edges between vertices T1 and T2; T2 and T3; T2 and T4; T4 and T5; and T5 and T6, illustrated as dashed lines. An edge between two vertices may indicate co-occurrence in one or more common operations, e.g., a SQL statement. For example, an edge between a vertex Ti and a vertex Tj may represent one or more cross-table operations that each involve at least the corresponding tables; for example, an edge may be included if a threshold amount of such operations has been performed, if a threshold amount of computational cost was involved in the operations, or that at least such an operation has taken place. Accordingly, a single edge may represent multiple different kinds of operations at the same time, e.g., an edge between T1 and T2 may represent a join between tables T1, T2, and T4 as well as a concatenation between tables T1 and T2 (e.g., with a weight indicating an overall computational cost of all these operations, as discussed below). Typically, there is at most one edge between each pair of vertices, and the edge is undirected, e.g., the graph GR is undirected and it is not a multigraph. However, with an appropriate graph partitioning procedure, using a multigraph is possible as well.

The graph GR may be weighted, with a weight of an edge indicating a computational cost of cross-table operations involving adjacent vertices of the edge, e.g., a DB load time caused by corresponding SQL statements. This is illustrated in the figure by the varying thickness of the dashed lines. For example, the figure shows an edge CTC, 309, representing the cross-table cost of operations involving nodes T1 and T2.

The graph GR may be determined by determining the edges, and optionally their weights, based on log data of previously performed operations.

For example, such log data may be obtained by activating a monitoring functionality of the database system, such as SAP's SQL Monitor (SQLM), for a certain time period. For example, for two weeks, preferably during peak load such as during a period end closing period. Such monitoring may result in a cross node join report indicating cross-table operations that have been performed.

The determining may take views or stored procedures into account, e.g., an operation may be determined to be a cross-table operation involving a set of tables, based on determining that the operation involves a call of a database view or stored procedure, and by including the tables that are (directly or indirectly) called by the view or stored procedure, into the set of tables.

As a detailed example, some or all of the following data may be collected in order to construct the graph GR. Detailed examples of instances of such data are provided elsewhere in this specification.

1) Monitoring data (e.g., SQLM)
    a) E.g. collected for a predefined amount of time, e.g. at least one or two weeks
    b) Optionally filtered, e.g., by excluding particular SQL operation types such as UPDATE, Commit, or Rollback
2) High-level view/stored procedure data
    a) May provide a mapping between high-level (e.g., SAP CDS) views/stored procedures and their low-level (e.g. SQL) equivalents
3) Low-level view/stored procedure data
    a) May provide set of tables belonging to a certain view 4) Table class info
    a) May indicate that a table is expensive to replicate
    b) Can indicate table class such as master data, transparent tables, SAP ABAP dictionary table, transaction data, etc. In this example, for example, a table having the transaction data table class may indicate that the table is expensive to replicate, e.g., since such a table is typically big and frequently updated.
5) Table size info
    a) Can be extracted, e.g., with a script
    b) Optionally, top-N (e.g., N=500 or 1000, depending on the system size) can be taken
6) Object info, e.g., HANA (any DB) Objects
    a) Can be used to filter out not DB Objects from SQLM data
    b) E.g., used to check for HANA tables and views in HANA table objects For example, the graph GR may be determined by iterating through logged cross-table operations (e.g., SQLM rows) reported by the monitoring functionality as follows:
1) IF a table occurs for the first time:
    a) add it as a new vertex to the graph GR
    b) look up the table size and add it as 'Table Size' attribute of the vertex (a default table size, e.g., 10 MB, may be set if a table is not listed in the top tables)
    c) look up table class and add this value as Tabarf attribute, if the table is not listed in class info table, add 'Not found' as a default value
    d) add "Total DB Execution Time [ms]" value as 'DB Load' attribute to the vertex
2) ELSE
    a) aggregate "Total DB Execution Time [ms]" of the new row to the already existing vertex attribute 'DB Load'
3) IF there are two or more tables in the SQLM row separated by coma, CDS, SQL View or a database procedure
    a) list all involved tables and create corresponding graph vertices, if needed
    b) create an edge between these tables
    c) divide the value specified in the current SQLM row as "Total DB Execution Time [ms]" between the involved tables equally and add up this value to the 'DB Load' attribute of the corresponding graph vertices
    d) assign or sum up "Total DB Execution Time [ms]" value as 'DB Load' attribute of the corresponding edge(s)

The figure shows a partitioning operation Part, 310 being applied to the graph GR to obtain a partitioning of the graph into multiple subgraphs. A partitioning may also be referred to as a graph decomposition, with the subgraphs also being referred to as sub-units or communities, see S. Fortunato et al., "Community Structure in Graphs", doi: 10.48550/ARXIV.0712.2716 (incorporated herein by reference).

The figure illustrates graph GR being subdivided into three subgraphs: subgraph SG1, 311 containing tables T1, T2, and T3; subgraph SG2, 312 containing table T6; and subgraph SG3, 313 containing tables T4 and T5. The partitioning may assign each table to a subgraph. Generally, a subgraph can contain any number of tables, e.g., the partitioning can result in one or more subgraphs with one item and/or one or more subgraphs with at least 5 items and/or one or more subgraphs with at least 10 items. As illustrated in the figure, the number of tables can differ per subgraph.

Generally, the partitioning Part may be performed by a graph partitioning procedure that is configured to encourage edges within a subgraph and discourage edges between subgraphs. An example of a suitable metric for such encouraging and discouraging is the modularity of the partitioning. For example, the partitioning Part may be implemented as an iterative optimization process. For a weighted graph, edges may be more strongly encouraged or discouraged according to their weight.

The partitioning may be configured to generate a number of subgraphs at least equal to the number of nodes across which the database is to be configured. This can be done in several ways. One is to use a hierarchical clustering which determines clustering at multiple levels, with an increasing number of subgraphs at lower levels. Another is to use a hyperparameter in the partitioning process that directly or indirectly controls the number of subgraphs that are created, e.g., a hyperparameter that indicates an amount of penalization for edges between subgraphs.

A particularly desirable way of performing the partitioning Part, is by performing a heuristic optimization of the modularity of the partitioning. Such a heuristic partitioning may be performed relatively efficiently also for large graphs, while still providing a high-quality partitioning. In particular, the partitioning may be performed iteratively by, in an iteration, identifying vertices to be grouped, and grouping the vertices into a single vertex for the next iteration. In particular, graph partitioning may be according to the Louvain method for community detection, of which a detailed implementation is described in V. Blondel et al., "Fast unfolding of communities in large networks". doi:10.1088/1742-5468/2008/10/P10008 (incorporated herein by reference), and an implementation is available in the Community API package, https://perso.crans.org/aynaud/communities/api.html. The inventors found that the Louvain graph decomposition method in particular works well in the present setting.

Moreover, Louvain or other iterative partitionings are beneficial because they can be implemented as a hierarchical procedure, that returns partitionings at multiple levels. These multiple levels are useful to distributed the tables across nodes, as discussed in more detail elsewhere.

In particular, the graph partitioning Part may return the multiple partitionings as a dendrogram. A dendrogram may be a tree, with respective levels representing respective partitionings of the graph vertices, in this case, tables of the distributed database. A vertex in the dendrogram may represent a subgraph at a given level, with child vertices of the vertex representing a partitioning of that subgraph into smaller subgraphs at a lower level. E.g., level 0 may be the first partition, which contains the smallest communities, and the first level below the root may provide the highest-quality partitioning (where the root may represent the full set of vertices). The higher the level is, the bigger the communities may be. For example, the following functions from the Community API software may be used: community_louvain.generate_dendrogram (Graph, weight='TotalDB-ExecutionTime_Edge',
    resolution=1000000) to determine the partitionings at the multiple levels, and community_louvain.partition_at_level (Dendogram,0), to return the level partitioning at a certain level, in this case, level 0.

Figures 5, 6, 7:
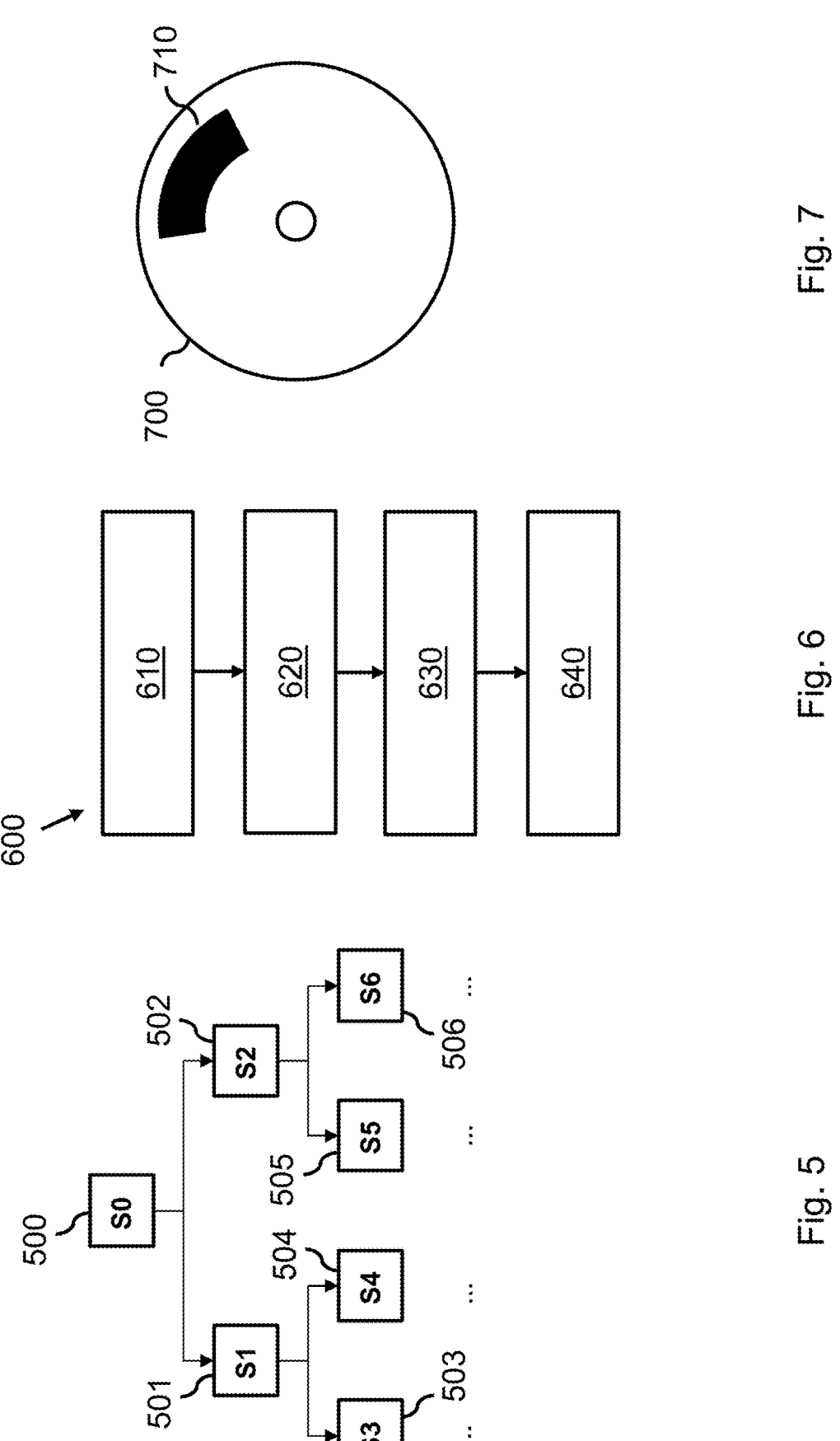
FIG. 5 shows an example of a hierarchical graph partitioning.
FIG. 6 shows a method of configuring a distributed database.
FIG. 7 shows a computer-readable medium comprising data.

This is illustrated in FIG. 5, which shows a hierarchical graph partitioning represented as a dendrogram. At the highest level, the graph may be represented as a single graph vertex S0, 500. For a respective vertex, child vertices may represent a partitioning of the corresponding subgraph into smaller subgraphs, e.g., graph S0 may be partitioned into subgraphs S1, 501 and S2, 502; and subgraphs S1 and S2 may in turn be partitioned into subgraphs S3, 503 and S4, 504; and S5, 505 and S6, 506; and so on. Generally, the number of subgraphs of a partitioning can vary between levels and between partitionings at the same level, e.g., a vertex at one level may be partitioned into two, three or more, or five or more vertices at a lower level. The number of levels can be at least two, at least three, or at least five, for example.

Returning to FIG. 3. Further shown is a distribution operation Dist, 340, in which a distribution DIST, 350 of the tables Ti of the distributed database across the multiple nodes Ni may be determined based on the partitioning determined by the partitioning operation Part. As illustrated, the distribution DIST may be determined by assigning respective subgraphs SGi of the partitioning to respective nodes Nj. For example, the figure shows subgraphs SG1 and SG2, being assigned to node N1 and subgraph SG2 being assigned to node N2. This way, table replication can be omitted for cross-table joins within the subgraph, and additional load caused by cross-node database accesses can be reduced. While preferably avoided if possible, it is possible to deviate from assigning complete subgraphs to nodes. For example, if a subgraph determined by the partitioning needs too much storage for a single node, it may be divided into multiple further subgraphs to be stored at respective nodes.

In particular, the subgraphs may be distributed based on respective storage sizes and/or computational loads of the tables of the respective subgraphs. In particular, as shown in the figure, the storage size $\Sigma SS$, 331 or computational load $\Sigma CL$ for a subgraph SG1 may be determined from the storage sizes SS, 321 and computational loads CL of the respective nodes T1 of the subgraph. The distribution operation Dist may distribute the subgraphs SGi evenly across the available nodes Ni, taking into account the available resources of those nodes, e.g., targeting an equal percentage of storage and/or computation capacities of the nodes Ni. In particular, the distribution operation may take the following three factors into account, e.g., with equal priority: 1) even storage (e.g., RAM) distribution; 2) minimal cross-subgraph operations, e.g., minimum or avoidance of table replication; 3) even database workload distribution.

For example, the distribution Dist may be implemented in a greedy way by, for respective subgraphs, determining a most suitable node based on the node-to-subgraph assignment so far, e.g., based on still-available storage at the node, cross-node operations introduced assigning the respective subgraph to the node, and/or still-available computational capacity at the node.

The distribution operation Dist may use an indication that a table is expensive to replicate. For example, such an indication may be derived from table metadata. In such a case, the subgraph containing the indicated table may be merged with one or more further subgraphs involved in cross-table operations with the indicated table. This can be done before distributing the subgraphs among the nodes, for example. This way, the expensive replication for this subgraph can be limited as much as possible.

As a concrete example, the distribution operation may be implemented by performing the following steps:

detect communities, which cannot be separated, e.g., a community that contains a first table that is expensive to replicate and a further community that contains a second table having cross-table operations with the first table; e.g., the first table may have an APPL1 class or may be a frequently changed table. In such a case, when distributing the table across different nodes, the first table may be a replication candidate of which copies may be needed for query processing; to avoid this, the communities may be combined;

sort communities by their size;

optionally, reserve a fixed percentage (e.g., 10% or more) of the capacity of one node for tables for which no or few cross-table operations are known;

set a number of server nodes and their sizes, indicating their available resources;

distribute communities based on their size and computational load between the nodes; in doing this, it can be beneficial to start with tables that are small and/or occur in a small subgraph (e.g., occur as singleton subgraphs) and place them on the same node, e.g., the node where capacity was reserved such as a coordinator node. The process may proceed in order from smaller subgraphs (e.g. in terms of number of tables, or overall table size) to larger subgraphs. Placing small tables on a single node, in particular a coordinator node of the query processing, has the advantage of having to move a small number of tables, thereby optimizing the operational impact.

As discussed, the distribution operation Dist may make use of a hierarchical clustering. In such a case, for example, the distribution operation may attempt to determine distributions according to multiple partitionings. For example, the distribution operation Dist can start at a high-level partitioning and go to lower-level partitionings, until a suitable distribution is found, e.g., one that respects the storage and/or computational requirements. Partitionings at different levels can be combined, e.g., a distribution may be based on a partitioning at a certain level until a subgraph is encountered that is too large to be fit into any node, in which case a lower-level partitioning may be used for that subgraph. Distributions can also be determined at several levels and scored against a quality metric, e.g., taking into account the number of cross-node operations and/or the evenness of the distribution of storage and/or computation.

Also shown in the figure is a correction operation Corr, 360, in which the determined distribution DIST may be adjusted. The distribution may be adjusted in response to a user request to move a certain subgraph SG2 from one node N2 to another node N1, e.g., to co-locate this subgraph SG2 with another subgraph SG1 on that other node N2. For example, the user may determine based on their domain knowledge that it is desirable to have the two subgraphs SG1 and SG2 on the same node, for example because cross-table operations may be expected between nodes of the subgraphs.

In such a case, to accommodate the moving of subgraph SG2, one or more subgraphs SG3 (other than the subgraph(s) SG1 with which SG2 is to be co-located) may be automatically determining to be moved from node N1 to N2 to make room (e.g., instead of computational load and/or storage) for subgraph SG2. The subgraphs SG3 to be moved may be determined for example based on their storage size and/or computational load, an/or based on an amount of cross-node operations introduced by moving the graph.

For example, the determined partitioning and distribution may be visualized to a user. A user interface may allow the user to progressively refine the assignment of tables to nodes by moving subgraphs across nodes, e.g., by dragging a subgraph and dropping it onto another subgraph that is to be stored at the same node, etc. Also other customizations may be supported, e.g., moving tables between subgraphs, and the like.

Some detailed examples are now given of instance data that may be collected in order to construct a graph representing a distributed database.

| 1) Monitoring data | |
| --- | --- |
| Example monitoring entry 1: | |
| Total DB Execution Time [ms]: | 145.372.169,961 |
| Total Number of DB Executions: | 128.490.941 |
| Total DB Records: | 128.490.941 |
| DB Mean Execution Time [ms]: | 1,131 |
| Mean DB Records: | 1,000 |
| Total DB Time/Records [ms/rec]: | 1,131 |
| Table Names: | EXAMPLE_CDS_VIEW_NAME |
| SQL Operation Type: | SELECT (Open SQL) |
| Example monitoring entry 2: | |
| Total DB Execution Time [ms]: | 141.551.183,018 |
| Total Number of DB Executions: | 648.603 |
| Total DB Records: | 19.845.008.322 |
| DB Mean Execution Time [ms]: | 218,240 |
| Mean DB Records: | 30.596,541 |
| Total DB Time/Records [ms/rec]: | 0,007 |
| Table Names: | MATDOC_EXTRACT |
| SQL Operation Type: | SELECT (Open SQL) |
| Example monitoring entry 3: | |
| Total DB Execution Time [ms]: | 139.855.260,094 |
| Total Number of DB Executions: | 81.090.000 |
| Total DB Records: | 81.090.000 |
| DB Mean Execution Time [ms]: | 1,725 |
| Mean DB Records: | 1,000 |
| Total DB Time/Records [ms/rec]: | 1,725 |
| Table Names: | WLK1, WRSZ, WRS1 |
| SQL Operation Type: | SELECT, FOR ALL ENTRIES |

| 2) High-level view/stored procedure data | |
| --- | --- |
| CDS View Name | SQL View Name |
| EXAMPLE_CDS_VIEW_NAME | EXAMPLE_SQL_VIEW_NAME_1 |

| 3) Low-level view/stored procedure data | |
| --- | --- |
| View Name | View Tables |
| EXAMPLE_SQL_VIEW_NM_1 | DDDDLCURRTYPES, EXAMPLE_SQL_VIEW_NM_2, DDDDLCHARTYPES, DDDDLNUMTYPES, DDDDLQUANTYPES |
| EXAMPLE_SQL_VIEW_NM_2 | DDDDLNUMTYPES, DDDDLQUANTYPES, DDDDLCURRTYPES, MATDOC_EXTRACT |

| 5) Table size info | | |
| --- | --- | --- |
| Examples: | Example 1 | Example 2 |
| SCHEMA_NAME | SAPQM7 | SAPQM7 |
| TABLE_NAME | MATDOC_EXTRACT | WLK1 |
| COLS | 42 | 19 |
| RECORDS | 3319313279 | 4258298 |
| DISK_GB | 134.12 | 0.18 |
| MEM_GB | 136.61 | 0.17 |
| PARTS | 2 | 1 |
| TAB_MEM_GB | 42.75 | 0.02 |
| INDEXES | 6/0/9 | 2/0/6 |
| IND_MEM | 93.86 | 0.14 |
| . . . | . . . | . . . |

Figure 4:
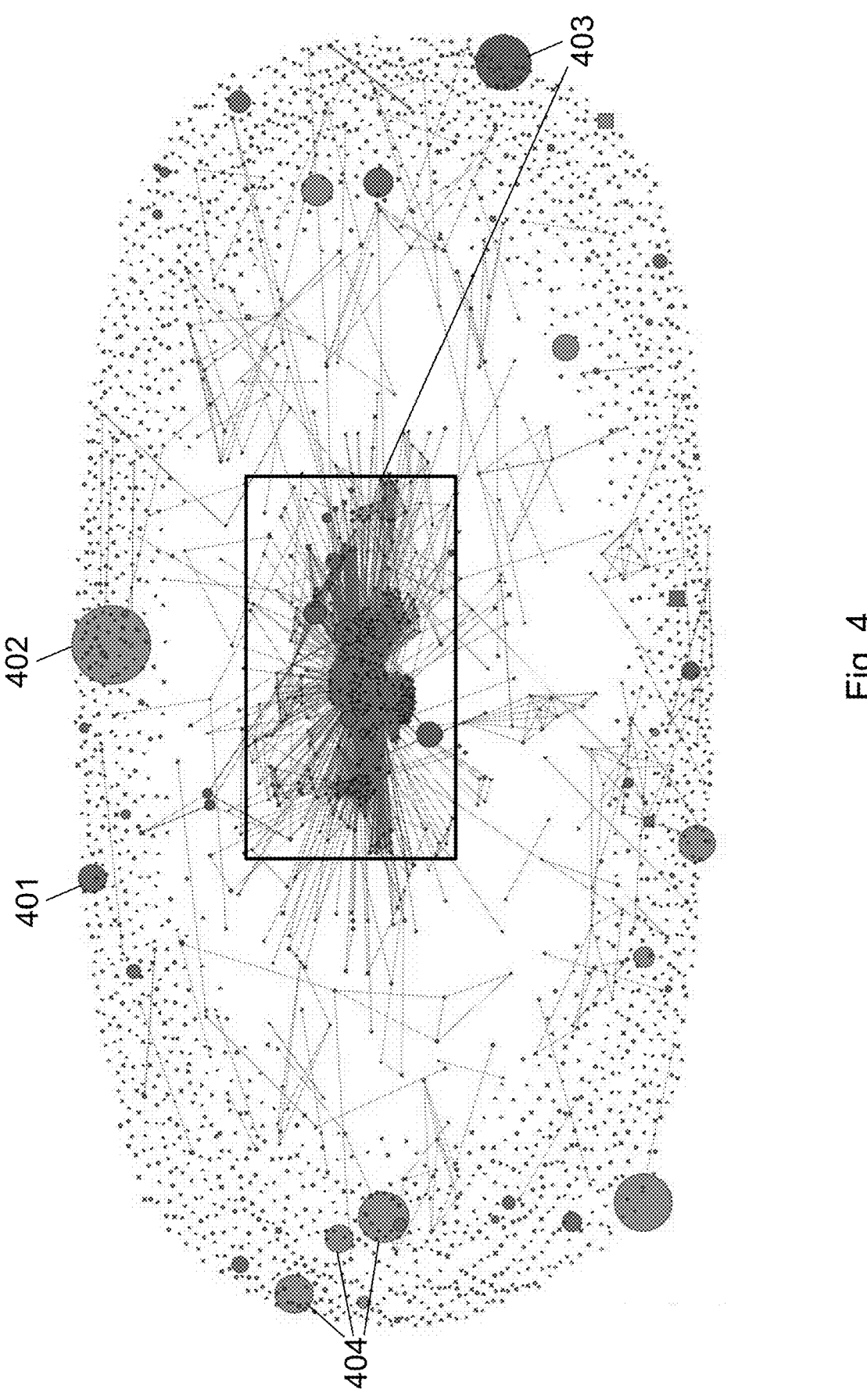
FIG. 4 shows an example of a distribution of tables across nodes.

FIG. 4 shows a detailed, yet non-limiting, example of a distribution of tables across nodes. This example shows a distribution of tables across four nodes based on a level-one partitioning of a hierarchical graph partitioning, in this case, a Louvain decomposition. Based on the partitioning at this level, a distribution of tables across nodes was determined that respected the given computational and storage requirements of the respective nodes.

In particular, in this example, a distribution was determined of a distributed SAP HANA database across four nodes. The figure illustrates the graph representing the distributed database. Vertices representing tables are shown, with the size of the vertex in the figure corresponding to the storage size of the table. Also, edges are shown representing cross-table operations determined to have taken place according to a log of the database. The total example of vertices in this example was 2872. The number of subgraphs identified by the level-one partitioning was 2262. A level-zero partitioning giving 2306 subgraphs was also performed (not shown in this figure), but using a higher-level partitioning is generally preferred since it is expected to lead to a smaller number of cross-node operations.

In particular, according to the determined distribution, the storage and computational load for the respective nodes is as follows:

| HANA Node 1 | HANA Node 2 | HANA Node 3 | HANA Node 4 |
|---|---|---|---|
| 2161 GB (25.0%) | 2160 GB (24.99%) | 1914 GB (22.15%) | 2145 GB (24.82%) |
| 6680 h (32.38%) | 2549 h (12.36%) | 8612 h (41.74%) | 2789 h (13.52%) |

In this case, it may be observed that the provided techniques distribute the storage sizes evenly across the server nodes, while respecting the computational loads. For example, table 401; table 402; tables 403; and tables 404 were determined to be stored at nodes 1, 2, 3, and 4, respectively. The figure also illustrates that a large cluster of tables with cross-table operations, indicated with the box in the figure, was identified and assigned to the same node, in this case node 3.

FIG. 6 shows a block-diagram of computer-implemented method 600 of configuring a distributed database. The database may be distributed across multiple nodes according to a table distribution by storing respective tables of the database at respective nodes. The method 600 may correspond to an operation of the system 100 of FIG. 1. However, this is not a limitation, in that the method 600 may also be performed using another system, apparatus or device.

The method 600 may comprise, in an operation titled "OBTAIN DB GRAPH", obtaining 610 data representing a graph of the distributed database. Respective vertices of the graph may represent the respective tables. Respective edges of the graph may represent cross-table operations involving adjacent vertices of the respective edges.

The method 600 may comprise, in an operation titled "PARTITION", applying 620 a graph partitioning procedure to the graph to obtain a partitioning of the graph into multiple subgraphs.

The method 600 may comprise, in an operation titled "DISTRIBUTE", determining 630 a distribution of the tables of the distributed database across the multiple nodes based on the partitioning of the graph.

The method 600 may comprise, in an operation titled "STORE ACCORDING TO DISTRIBUTION", configuring 640 the storage of the tables according to the determined distribution of the tables across the multiple nodes.

It will be appreciated that, in general, the operations of method 600 of FIG. 6 may be performed in any suitable order, e.g., consecutively, simultaneously, or a combination thereof, subject to, where applicable, a particular order being necessitated, e.g., by input/output relations.

The method(s) may be implemented on a computer as a computer implemented method, as dedicated hardware, or as a combination of both. As also illustrated in FIG. 7, instructions for the computer, e.g., executable code, may be stored on a computer readable medium 700, e.g., in the form of a series 710 of machine-readable physical marks and/or as a series of elements having different electrical, e.g., magnetic, or optical properties or values. The medium 700 may be transitory or non-transitory. Examples of computer readable mediums include memory devices, optical storage devices, integrated circuits, servers, online software, etc. FIG. 7 shows an optical disc 700.

Examples, embodiments or optional features, whether indicated as non-limiting or not, are not to be understood as limiting the invention as claimed.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method of configuring a distributed database, wherein the database is distributed across multiple nodes according to a table distribution by storing respective tables of the database at respective nodes, wherein the method comprises:

obtaining log data indicating previously performed operations on the distributed database;

determining a graph of the distributed database from the log data, wherein respective vertices of the graph represent the respective tables, and wherein respective edges of the graph represent cross-table operations involving adjacent vertices of the respective edges;

wherein the graph is weighted, wherein a weight of an edge indicates a computational cost of cross-table operations involving adjacent vertices of the edge;

applying a graph partitioning procedure to the graph to obtain a partitioning of the graph into multiple subgraphs, each of the multiple subgraphs being associated with at least one vertex of the respective vertices, the graph partitioning procedure being applied to minimize at least one of the number or weight of edges between vertices that belong to different subgraphs, each of the multiple subgraphs being uniquely associated with a particular node of the respective nodes;

determining a distribution of the tables of the distributed database across the multiple nodes based on the partitioning of the graph and on expected costs to replicate information in each of the tables;

obtaining an indication that a table is too expensive to replicate, and merging the subgraph containing the indicated table with one or more subgraphs involved in cross-table operations with the indicated table;

and configuring the storage of the tables according to the determined distribution of the tables across the multiple nodes.

2. The method of claim 1, wherein the graph partitioning procedure is configured to perform a heuristic optimization of a modularity of the partitioning.

3. The method of claim 2, wherein the graph partitioning procedure is hierarchical, returning partitionings of the graph at multiple levels; and wherein the distribution of the tables is determined based on the multiple partitionings.

4. The method of claim 1, wherein the distribution is determined by assigning the respective subgraphs of the partitioning to respective nodes.

5. The method of claim 4, wherein the distribution is determined based on respective storage sizes and/or computational loads of the tables of the respective subgraphs.

6. The method of claim 1, wherein the distributed database comprises at least 100000 tables.

7. The method of claim 1, further comprising determining that an operation is a cross-table operation based on determining that the operation calls a database view or stored procedure and based on determining a set of tables called by the database view or stored procedure.

8. The method of claim 1, further comprising obtaining an indication that a table is expensive to replicate, and merging the subgraph containing the indicated table with one or more further subgraphs involved in cross-table operations with the indicated table.

9. The method of claim 1, comprising obtaining a user request to move a first subgraph from a first node to a second node to co-locate the first subgraph with a second subgraph on the second node; and automatically determining one or more subgraphs to be moved from the second node to the first node to accommodate the moving of the first subgraph.

10. The method of claim 1, comprising reconfiguring the distributed database by moving the tables across the nodes according to the determined distribution.

11. The method of claim 1, further comprising obtaining a request for a cross-node operation on the database, the database having been distributed according to the determined distribution; and performing an automated replication to accommodate the request, wherein a further node obtains a slave copy of a table of the cross-node operation from the node that stores the table.

12. A configuration system for configuring a distributed database, wherein the database is distributed across multiple nodes according to a table distribution by storing respective tables of the database at respective nodes, wherein the system comprises:

a data interface for accessing data representing a graph of the distributed database, wherein respective vertices of the graph represent the respective tables, and wherein respective edges of the graph represent cross-table operations involving adjacent vertices of the respective edges;

wherein the graph is weighted, wherein a weight of an edge indicates a computational cost of cross-table operations involving adjacent vertices of the edge;

a processor subsystem configured to: apply a graph partitioning procedure to the graph to obtain a partitioning of the graph into multiple subgraphs, each of the multiple subgraphs being associated with at least one vertex of the respective vertices, the graph partitioning procedure being applied to minimize at least one of the number or weight of edges between vertices that belong to different subgraphs, each of the multiple subgraphs being uniquely associated with a particular node of the respective nodes;

determine a distribution of the tables of the distributed database across the multiple nodes based on the partitioning of the graph and on expected costs to replicate information in each of the tables;

obtain an indication that a table is too expensive to replicate, and merge the subgraph containing the indicated table with one or more subgraphs involved in cross-table operations with the indicated table; and configure the storage of the tables according to the determined distribution of the tables across the multiple nodes.

13. The configuration system of claim 12, wherein the graph partitioning procedure is configured to perform a heuristic optimization of a modularity of the partitioning.

14. The configuration system of claim 13, wherein the graph partitioning procedure is hierarchical, returning partitionings of the graph at multiple levels; and wherein the distribution of the tables is determined based on the multiple partitionings.

15. The configuration system of claim 12, wherein the distribution is determined by assigning the respective subgraphs of the partitioning to respective nodes.

16. The configuration system of claim 15, wherein the distribution is determined based on respective storage sizes and/or computational loads of the tables of the respective subgraphs.

17. A non-transitory computer-readable medium storing data representing instructions which, when executed by a processor system, cause the processor system to:

obtain log data indicating previously performed operations on the distributed database;

determine a graph of a database from the log data, wherein the database is distributed across multiple nodes according to a table distribution by storing respective tables of the database at respective nodes, wherein respective vertices of the graph represent the respective tables, and wherein respective edges of the graph represent cross-table operations involving adjacent vertices of the respective edges;

wherein the graph is weighted, wherein a weight of an edge indicates a computational cost of cross-table operations involving adjacent vertices of the edge;

apply a graph partitioning procedure to the graph to obtain a partitioning of the graph into multiple subgraphs, each of the multiple subgraphs being associated with at least one vertex of the respective vertices, the graph partitioning procedure being applied to minimize at least one of the number or weight of edges between vertices that belong to different subgraphs, each of the multiple subgraphs being uniquely associated with a particular node of the respective nodes;

determine a distribution of the tables of the database across the multiple nodes based on the partitioning of the graph and on expected costs to replicate information in each of the tables;

obtain an indication that a table is too expensive to replicate, and merge the subgraph containing the indicated table with one or more subgraphs involved in cross-table operations with the indicated table; and configure the storage of the tables according to the determined distribution of the tables across the multiple nodes.

18. The medium of claim 17, wherein the graph partitioning procedure is configured to perform a heuristic optimization of a modularity of the partitioning.

19. The medium of claim 18, wherein the graph partitioning procedure is hierarchical, returning partitionings of the graph at multiple levels; and wherein the distribution of the tables is determined based on the multiple partitionings.

* * * * *